(No Model.)
H. KLAHR.
THILL COUPLING.
No. 570,131. Patented Oct. 27, 1896.
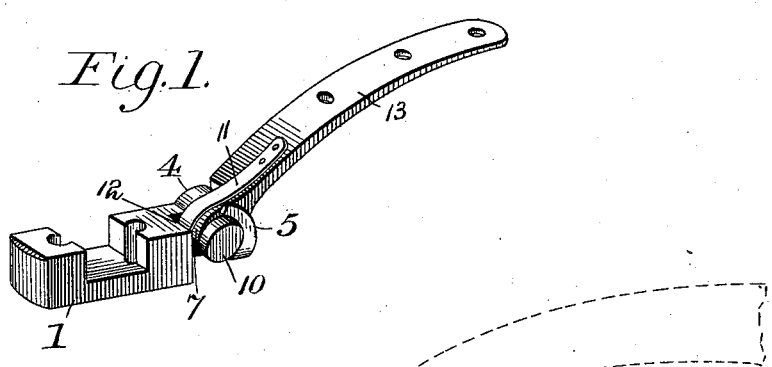
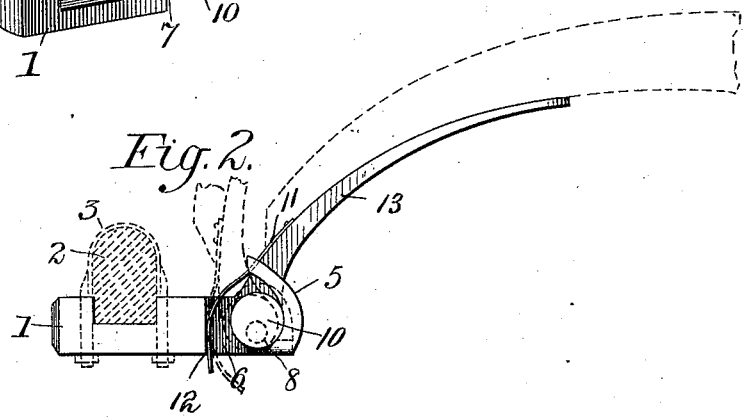
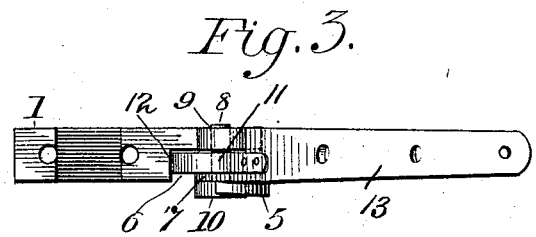
Witnesses:
F. M. Richardson,
Jno. P. Seip
Inventor.
Howard Klahr
By Jacob H. Weible
Attorney

UNITED STATES PATENT OFFICE.

HOWARD KLAHR, OF ORWIGSBURG, PENNSYLVANIA, ASSIGNOR TO JACOB H. WEIBLE, OF STRAUSSTOWN, PENNSYLVANIA.

THILL-COUPLING.

SPECIFICATION forming part of Letters Patent No. 570,131, dated October 27, 1896.

Application filed May 23, 1896. Serial No. 592,887. (No model.)

*To all whom it may concern:*

Be it known that I, HOWARD KLAHR, a citizen of the United States, residing at Orwigsburg, in the county of Schuylkill and State of Pennsylvania, have invented certain new and useful Improvements in Thill-Couplings, of which the following is a specification.

My invention relates to a new and useful improvement in thill-couplings, and has for its object to provide such a device that will permit the shafts to be coupled to the clips and disconnected therefrom with but little loss of time.

With these ends in view my invention consists in the details of construction and combination of elements hereinafter set forth, and then specifically designated by the claims.

In order that those skilled in the art to which this invention appertains may understand how to make and use the same, I will describe its construction and operation in detail, referring by number to the accompanying drawings, forming a part of this specification, and in which—

Figure 1 is a perspective of my improved thill-coupling; Fig. 2, a side elevation of the clip and thill, the axle being in section; and Fig. 3, a plan view of the clip and thill.

Similar numbers denote like parts in the several views of the drawings.

Referring to the drawings, 1 represents the clip, adapted to fit against the under side of the axle 2 and be secured thereto by a strap 3. This clip is extended forward and provided with a hub 4 and a hook 5 so arranged as to form a slot 6 therebetween, into which the shank 7 of the thill-iron 13 is adapted to fit and swing.

8 is a pin which projects from one side of the shank 7 and is arranged to fit within the hole 9.

10 is a boss projecting from the opposite side of the shank eccentric to the pin 8, and is adapted to fit within the hook 5.

11 is a spring riveted or otherwise suitably secured at one end to the thill-iron 13 and having its free end curved and extending over the shank 7 to bear against a shoulder 12, formed on the clip 1 in rear of the hub and hook.

In order to couple the thill-iron and clip together, it is only necessary to bring the former into the position shown in dotted lines in Fig. 2 and move it laterally until the pin 8 enters the hole 9, when the iron can be swung downwardly to bring the shank 7 into the slot 6. This downward movement will cause the eccentric boss to move into engagement with the hook 5 and the free end of the spring to bear against the shoulder 12 and hold the front sides of the pin and boss in snug contact with the hole and hook and thereby prevent rattling.

It is obvious that the thill-iron and clip may be just as easily uncoupled.

Having thus fully described my invention, what I claim as new and useful is—

1. A thill-coupling consisting of the clip-iron having a forward extension provided with a hub and a hook so arranged that a slot is formed between them, said hub having a hole formed therein, and a thill-iron having a shank to fit in the slot between said hub and hook, said shank having a pin projecting from one side to fit in the hole in said hub, and a boss on the opposite side eccentric to the pin to engage the said hook, substantially as and for the purpose specified.

2. A thill-coupling consisting of the clip-iron having a forward extension provided with a hub and a hook so arranged that a slot is formed between them, said hub having a hole formed therein and the clip-iron having a shoulder formed thereon in rear of the hub and hook, a thill-iron having a shank to fit in the slot between the said hub and hook, said shank having a pin projecting from one side to fit in the hole in said hub, and a boss on the opposite side eccentric to the pin to engage the said hook, and a spring secured at one end to the thill-iron and having its free end curved and extending over the shank of the thill-iron to engage the said shoulder on the clip-iron, substantially as and for the purpose specified.

In testimony whereof I have hereunto affixed my signature in the presence of two subscribing witnesses.

HOWARD KLAHR.

Witnesses:
S. S. WILLIAMSON,
H. H. BROWNMILLER.